US007904628B2

(12) United States Patent
Groesch (10) Patent No.: US 7,904,628 B2
(45) Date of Patent: Mar. 8, 2011

(54) SMART DOCKING SYSTEM (75) Inventor: Michael R. Groesch, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 12/147,456

(22) Filed: Jun. 26, 2008

(65) Prior Publication Data
US 2009/0327561 A1 Dec. 31, 2009

(51) Int. Cl.
G06F 13/00 (2006.01)
(52) U.S. Cl. ............... 710/303; 710/305; 361/679.01
(58) Field of Classification Search .......... 710/301–306; 455/66; 361/679
See application file for complete search history.

(56) References Cited

U.S. PATENT DOCUMENTS

| 2004/0224638 | A1* | 11/2004 | Fadell et al. ............... 455/66.1 |
|---|---|---|---|
| 2006/0094349 | A1 | 5/2006 | Slesak et al. |
| 2006/0212637 | A1 | 9/2006 | Lo |
| 2007/0130592 | A1 | 6/2007 | Haeusel |
| 2007/0250193 | A1 | 10/2007 | Raines |
| 2007/0288678 | A1 | 12/2007 | Langberg |
| 2008/0158444 | A1 | 7/2008 | Chuang et al. |

OTHER PUBLICATIONS

Jeff Bakalar, "Philips DCP851 Portable DVD Player w/ iPod Dock"—Published Date: Feb. 13, 2008, http://reviews.cnet.com/portable-dvd-players/philips-dcp851-portable-dvd/4505-6498_7-32909149.html.
Author Unknown, "IME Portable Media Player Docking System"—Published Date: Oct. 2007—http://www.printer-ink-cartridges-guide.com/inkfol/ime-docking.shtml.
Author unkown, "JVC Intro's the Dual iPod/iPhone Docking Station"—Published Date: Jun. 23, 2008—http://www.iphonefreak.com/2008/06/jvc-intros-the-dual-ipodiphone-docking-station.html.

* cited by examiner

*Primary Examiner* — Khanh Dang
*Assistant Examiner* — Kim T Huynh
(74) *Attorney, Agent, or Firm* — Mayer & Williams PC (57) ABSTRACT

A smart docking system is provided by a portable electronic device that is adapted to dock with a media player shuttle. When docked, the media player shuttle adds the capability for rendering media content that is stored on the shuttle to the native functionality that is supported by the portable electronic device. The native functionality may vary, and may include that provided by a digital camera or handheld game device, for example. The media player shuttle includes storage for media content such as audio and video and a digital media processing system, but does not include a display screen or user controls. Instead, the display screen and user controls are provided by the portable electronic device when the shuttle is docked.

20 Claims, 10 Drawing Sheets

SMART DOCKING SYSTEM

BACKGROUND

Portable electronic devices such as mobile phones, personal digital assistants ("PDAs"), smart phones, handheld game devices, digital cameras and video recorders, personal media players such as MP3 (Moving Pictures Expert Group, MPEG-1, audio layer 3) players, handheld computers, and the like are becoming increasingly popular in both business and consumer environments. The small size and light weight of the devices combined with the portability that is provided by their battery-powered operation enables users of the devices to take advantage of the features they provide whenever and wherever they want. Many portable electronic devices also have wireless networking capability which provides yet further functionality and utility.

Because of the devices' utility and small size, users may often carry more than one portable electronic device at a time. It is not unusual, for example, for a user to have a personal media player in one pocket and a mobile phone in another. And if the user needs different functionality, then even more devices might be carried. Manufacturers have recognized that the proliferation of devices can represent a problem for users and have responded by integrating multiple functionalities or services into a single device.

When designing single integrated devices, manufacturers typically need to balance factors like feature set, device size, battery life, and cost to attempt to meet consumers' needs and expectations. Unfortunately, the compromises made in a single integrated device can result in the performance or capabilities of any given function being reduced compared to the same function that is provided by a dedicated device such as a digital camera, media player, or handheld game device. For example, a single integrated device might include a digital camera, media player, and a mobile phone where the device is purposely designed so that the performance of the phone is kept uncompromised but the camera and media player are not as fully functional as their dedicated counterparts in order to meet a desired retail price target, for example, for the integrated device. While such tradeoffs are generally accepted by consumers, single integrated devices are not expected to replace dedicated devices. As a result, additional solutions would be desirable that can reduce device proliferation without compromising the performance of any of the functionalities provided.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A smart docking system is provided by a portable electronic device that is adapted to dock with a media player shuttle. When docked, the media player shuttle adds the capability for rendering media content that is stored on the shuttle to the native functionality that is supported by the portable electronic device. The native functionality may vary, and may include that provided by a digital camera or handheld game device, for example. The media player shuttle includes storage for media content such as audio and video and a digital media processing system, but does not include a display screen or user controls. Instead, the display screen and user controls are provided by the portable electronic device when the shuttle is docked.

In various illustrative examples, the media player shuttle is configured with a compact form factor that snaps into place to dock with different types of portable electronic devices which illustratively include a digital camera and a handheld game device. The media player shuttle enables the portable electronic device to operate as a fully functional media player using its display screen and user controls without any compromise in the performance of its native functionality (i.e., as a camera or game device). In addition to gaining media player functionality when docked with the media player shuttle, the host portable electronic device can be used to connect the shuttle to other devices such as personal computers ("PCs") in order to download media content or synchronize data between the PC and the shuttle.

Advantageously, the smart docking system gives more choices to users to match the specific fully functional components to their needs. Device proliferation is reduced without compromising the performance of any functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
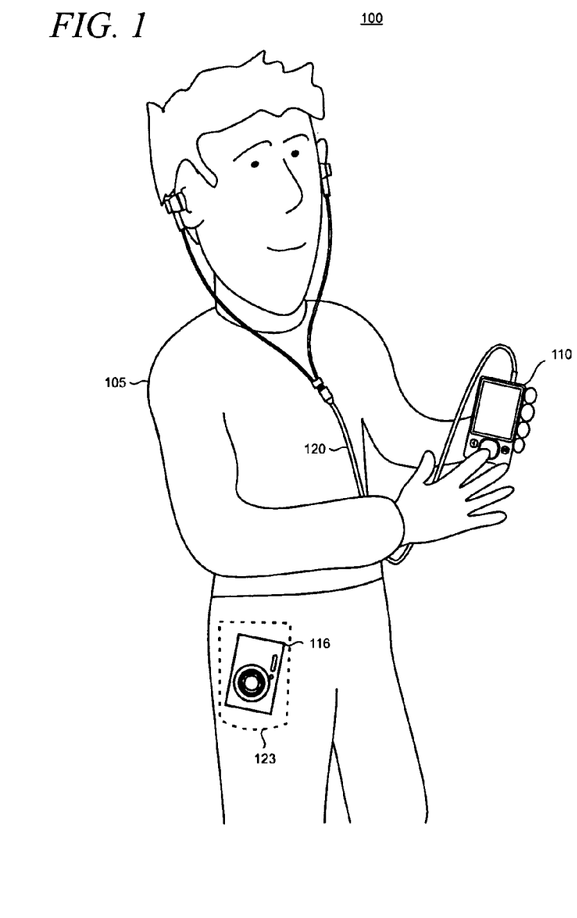
FIG. 1 shows a typical portable electronic device usage environment in which a user possesses several devices with dedicated functionality.

FIG. 1 shows a typical portable electronic device usage environment 100 in which a user 105 possesses several discrete devices that provide dedicated functionality including a personal media player 110 and a digital camera 116. The personal media player 110 is representative of the popular players available on the market that can play audio content such as MP3 files or from over-the-air radio stations, display video and photographs, and render other content. The user 105 will typically use earphones 120 to enable audio content, such as music or the audio portion of video content, to be consumed privately (i.e., without the audio content being heard by others) and at volume levels that are satisfactory for the user while maintaining good battery life in the personal media player 110. Earphones 120 are representative of a class of devices used to render audio which may also be known as headphones, earbuds, headsets, and by other terms. Earphones 120 generally will be configured with a pair of audio speakers (one for each ear), or less commonly a single speaker, along with a means to place the speakers close to the user's ears.

In this example, user 105 has his digital camera 116 stored in a pocket 123 while using and interacting with the personal media player 110. The digital camera 116 is representative of popular compact devices that can take both still and video images that can be saved to onboard memory and then transferred to a PC for viewing, printing, or sharing with friends and family using e-mail and various web services that enable content sharing. User 105 might also have other portable electronic devices such as a mobile phone or handheld game device (not shown). The proliferation of devices that users want to have handy can often frustrate users with the inconvenience of carrying them all, even though each device individually can be small. However, for many users, single integrated devices do not provide the desired level of functionality so these users continue to favor dedicated devices.

The proliferation problem can also grow bigger when taking into account the various accessories like communications cables and AC power adapters that must typically be used with each of the different devices. So for example, when the user 105 packs his briefcase for a business trip, he must make sure to bring all the various cables and accessories to keep all the devices functional during the course of the trip. The present smart docking system is arranged to address, among other issues, the inconvenience that is associated with the proliferation of portable electronic devices, as described more fully below.

Figure 2:
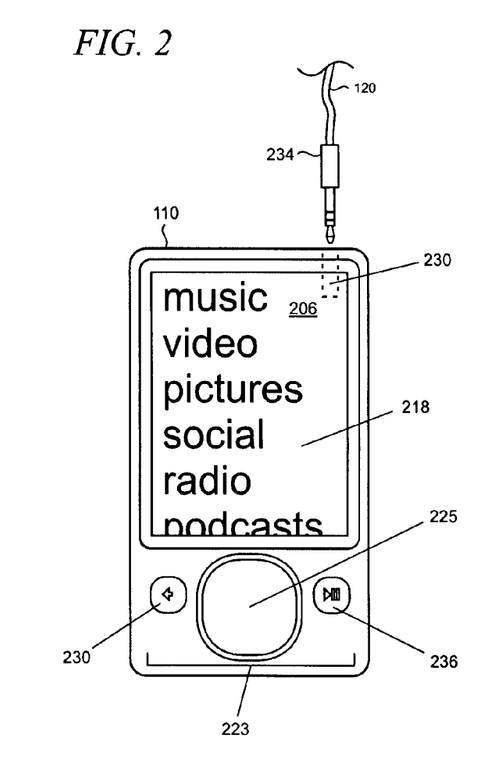
FIG. 2 shows various features of an illustrative personal media player.

Referring now to FIG. 2, the personal media player 110 typically uses a graphical user interface ("GUI") 206 that is rendered on a display screen 218, as well as user controls 223. The GUI 206 uses menus, icons, and the like to enable the user 105 to find, select, and control playback of media content that is available to the player 110. In addition to supporting the GUI 206, the display screen 218 is also used to render video content, typically by turning the player 110 to a landscape orientation so that the long axis of the display screen 218 is parallel to the ground.

The user controls 223, in this example, include a gesture pad 225, called a G-Pad, which combines the functionality of a conventional directional pad (i.e., a "D-pad") with a touch sensitive surface as described in U.S. Patent Application Ser. No. 60/987,399, filed Nov. 12, 2007, entitled "User Interface with Physics Engine for Natural Gestural Control," owned by the assignee of the present application and hereby incorporated by reference in its entirety having the same effect as if set forth in length. A "back" button 230 and a "play/pause" button 236 are also provided. However, other types of user controls may also be used depending on the requirements of a particular implementation. The user 105 will manipulate the user controls 223 to make selections of media content, control operation of the personal media player 110, set preferences, and the like through the GUI 206.

In alternative implementations, the user controls may be embodied as part of a touch screen that is also used, in whole or part, as the main display screen for the personal media player. Many different types of touch sensor technologies are known and may be applied as required to meet the needs of a particular implementation. These include resistive, capacitive, near field, optical imaging, strain gauge, dispersive signal, acoustic pulse recognition, infrared, and surface acoustic wave technologies, among others. Some current touch screens can discriminate among multiple, simultaneous touch points and/or are pressure-sensitive. Interaction with a touch screen is typically accomplished using fingers or thumbs, or for non-capacitive type touch sensors, a stylus may also be used.

An audio jack 230 is located on the top of the personal media player 110. The audio jack 230 interfaces with a corresponding plug 234 that is located at the end of the earphones 120.

Figure 3:
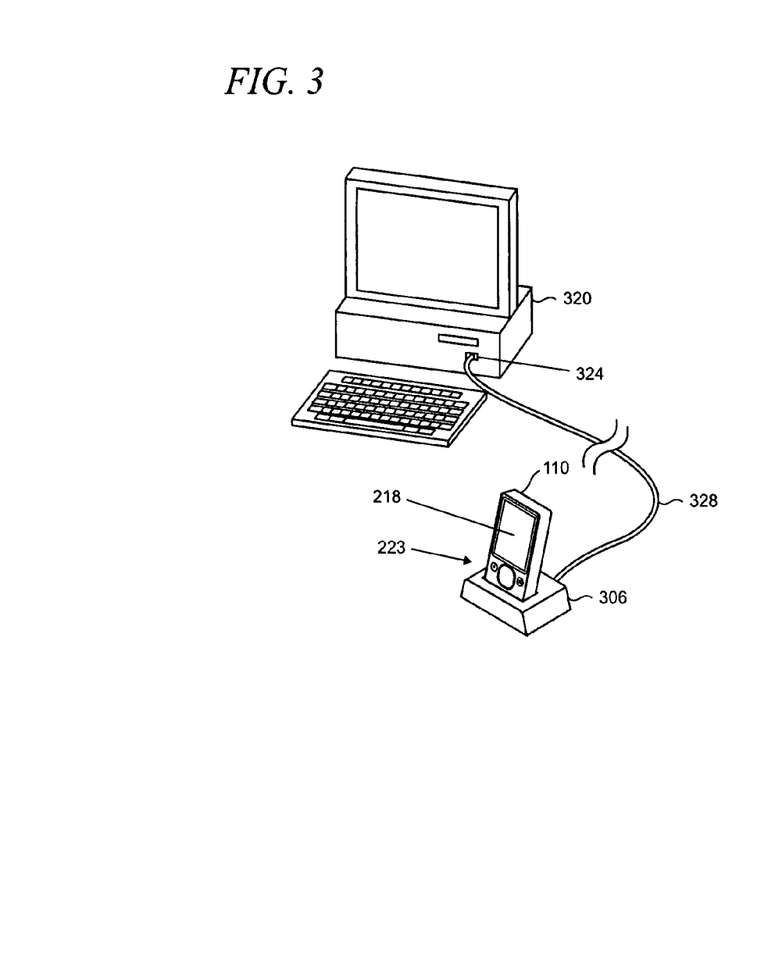
FIG. 3 shows an illustrative arrangement in which a personal media player is inserted in a dock that is operatively connected to a personal computer with a synchronization ("sync") cable.

FIG. 3 shows the personal media player 110 as typically inserted into a dock 306 for synchronization with a desktop PC 320. Dock 306 is coupled to a port 324 such as a USB (Universal Serial Bus) port with a synchronization ("sync") cable 328, in this example. In alternative arrangements, the personal media player 110 may be coupled directly to the sync cable 328 without using the dock 306. In addition, other arrangements may also be used to implement communications between the personal media player 110 and PC 320 including, for example, those employing RF (radio frequency) wireless protocols such as Bluetooth, or Wi-Fi (i.e., the Institute of Electrical and Electronics Engineers, IEEE 802.11 standards family).

Figure 4:
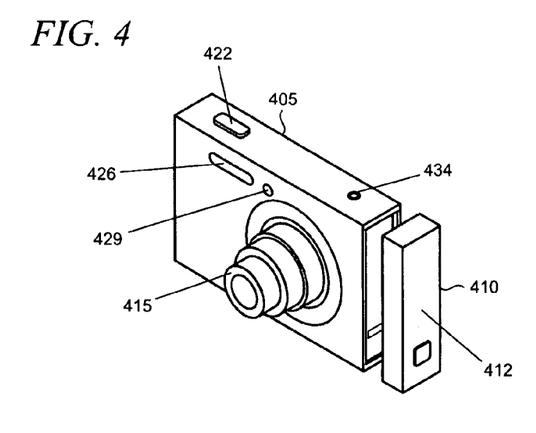
FIGS. 4-7 show various views of an illustrative camera that is adapted to dock with a media player shuttle.
Figure 5:
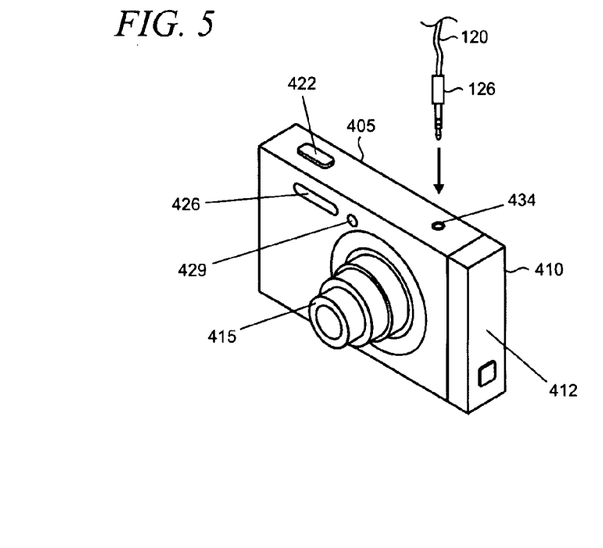

FIG. 4 shows an illustrative example of the present smart docking system in which a digital camera 405 is adapted to interface with a media player shuttle 410. Although such adaptation enables the camera 405 to operate as a fully functional media player when the shuttle is docked to it, as shown in FIG. 5, the camera otherwise operates conventionally in supporting a comprehensive set of features and functionalities as is typical for currently available compact digital cameras. Accordingly, camera 405 has an adjustable zoom lens 415, a shutter release 422, a flash unit 426, and a self portrait timing indicator 429. It is noted that these features are illustrative, and that other camera designs may provide other features or similar features that are embodied differently.

Also provided is an audio jack 434 that is arranged to interface with a corresponding plug of an earphone set, such as plug 126 in the earphone set 120 that are shown in FIG. 1 and described in the accompanying text. When the audio rendering capability provided by the media player shuttle 410 is utilized, the user will typically listen to audio content that is stored on the shuttle through earphones that are plugged into the audio jack 434.

As shown, the media player shuttle 410 is arranged with a body 412, having a compact form factor, but is not normally arranged with a user interface including either display screen or user controls, although it otherwise is configured with components to support full media player functionality. Instead, the display screen and user controls are supplied by the host portable electronic device to which it is docked. In some implementations, the media player shuttle 410 might also be configured to have a smaller on-board battery compared with the conventional player 110 (or in some cases, no battery at all) and rely on power provided by the host device to which it is docked.

Figure 6:
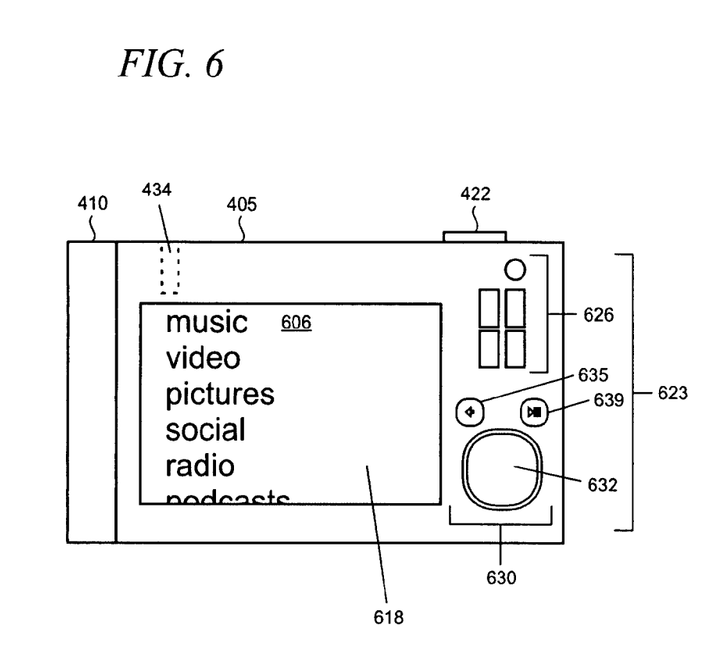
Figure 7:
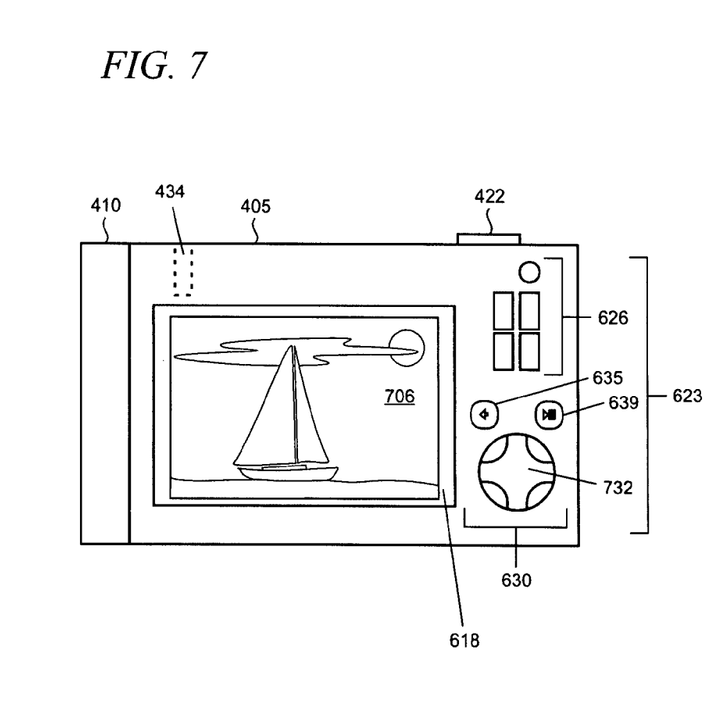

As shown in FIGS. 6 and 7, which show back views of the camera 405 to which the media player shuttle 410 is docked, a GUI 606 is supported on the camera's display screen 618 that enables the user 105 to interact with, and control the functionalities provided by the media player shuttle 410. The GUI 606 is arranged with a menu structure that is similar to the typical structures used in conventional personal media players such as GUI 206 shown on the personal media player 110 in FIG. 2. It is emphasized, however, that the GUI 206 is intended to be illustrative, and that other GUI arrangements may be used to meet the requirements of a particular implementation.

In addition to supporting the GUI for the media player shuttle 410, the display screen 618 on the camera 405 is used as a playback system to render video content that is stored on the shuttle. Such video content may include, for example, music video, television shows, movies, etc. that the user 105 can watch on the display screen 618 and while listening to the accompanying audio soundtrack using earphones that are plugged into the audio jack 434. A representative shot 706 from a piece of video content that is rendered by the media player shuttle 410 on the camera's display screen 618 is shown in FIG. 7.

When not used to support the GUI 606 and playback system for the media player shuttle 410, the display screen 618 will operate normally to support the native digital camera functionality. Thus, for example, it will operate to support a GUI to operate the camera 405, and also function as a view finder and playback monitor for captured still and video images.

A set of user controls 623 is supported by the camera 405. The user controls 623 include a set of camera-specific controls 626, and a set of media player controls 630. As shown in FIG. 6, the media player controls include a G-pad 632. A "back" button 635 and "play/pause" button 639 are also provided. In this example, the media player controls 630 are also configured to be usable to support the camera functionality. Thus, the G-pad 632 shown may serve double duty to enable the user to navigate menus and control functionality for both the media player shuttle 410 and camera 405. However, in alternative implementations separate user controls may be dedicated to specific functionalities. In addition, other types of user controls may also be utilized depending on the requirements of a particular implementation. For example, as shown in FIG. 7, a conventional D-pad 732 is utilized.

Figure 8:
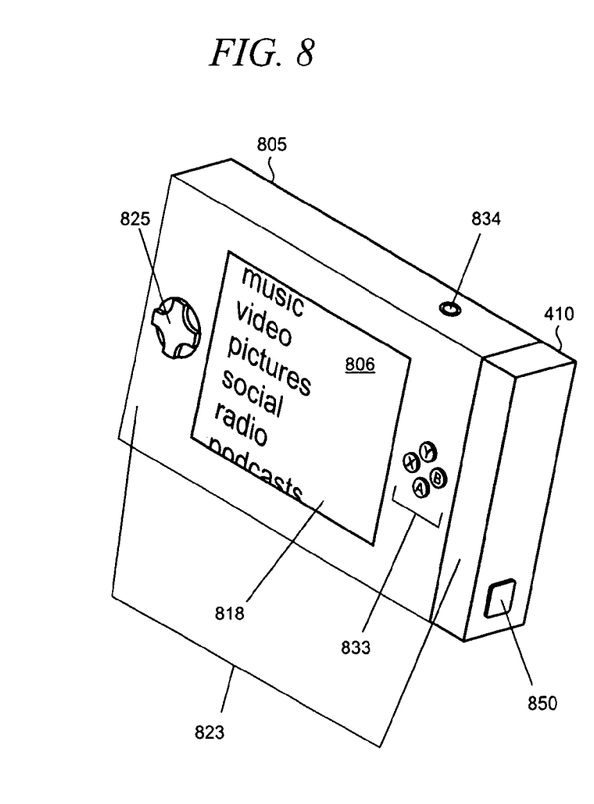
FIG. 8 shows an illustrative handheld video game player that is adapted to dock with a media player shuttle.

FIG. 8 shows another example of an illustrative portable electronic device that is adapted to interface with the media player shuttle 410. In this example, a handheld game device 805 operates as a platform for video game content that may be accessed, for example, from removable media such as a memory card or cartridge (not shown). The handheld game device 805 includes a representative set of user controls 823 including a D-pad 825 and a set of four buttons 833. However, such user controls are illustrative and other types of controls may also be utilized. For example, a G-pad as shown in FIGS. 2 and 6 could be used in some scenarios.

When the media player shuttle 410 is docked to the handheld game device 805, the device is enabled to operate as a fully functional media player. However, the device 805 is still operable as a handheld game player that supports the usual and customary video gaming features. For example, a video game will be shown on display screen 818 of the handheld game device 805 and the user 105 can listen to sound effects and other audio that is associated with the gameplay using earphones that interface with an audio jack 834.

As shown, the display screen 818 of the handheld game device 805 supports a GUI 806 that enables the user 105 to interact with, and control the functionalities provided by the media player shuttle 410 when it is docked. As with the GUI used with the camera 405, the GUI 806 here is arranged with a menu structure that is similar to the typical structures used in conventional personal media players such as GUI 206 shown on the personal media player 110 in FIG. 2. It is emphasized, however, that the GUI 806 is intended to be illustrative, and that other GUI arrangements may be used to meet the requirements of a particular implementation.

When the audio rendering capability provided by the media player shuttle 410 is utilized, the user will typically listen to audio content that is stored on the shuttle through earphones that are plugged into the audio jack 834.

The camera 405 and handheld game device 805 are intended to be illustrative examples of the present smart docking system. However, they should not be construed as the only types of portable electronic devices that may be adapted to interface with the media player shuttle. Other devices may also be adapted and utilized as smart docks including for example, mobile phones, PDAs, handheld computers, smart phones, or devices having combinations of functions provided therein.

The media player shuttle 410 will typically be arranged with a compact form factor that is configured to enable the user 105 to easily snap it into place on a portable electronic device (e.g., the camera 405 or handheld game device 805 that are specially adapted to interface with the shuttle) and remove it without tools when its functionality is not needed. In this regard, a release button 850 may be provided that allows the shuttle 410 to be removed when pressed by the user 105. It is noted, however, that other retention mechanisms and arrangements may also be used. For example, friction fit and other known snap-fit arrangements may also be used depending on the requirements of a particular implementation.

Figure 9:
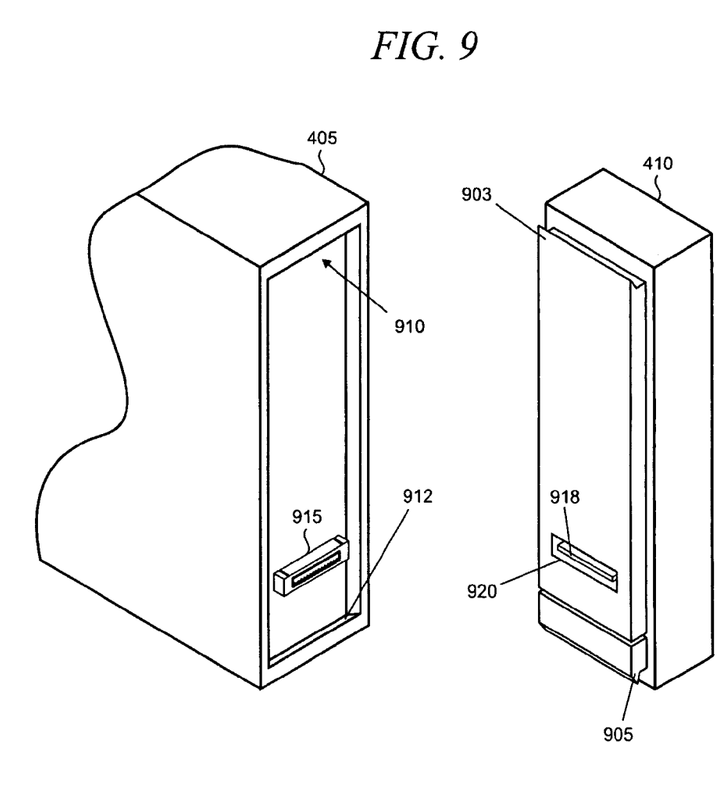
FIGS. 9-12 show details of a snap-in engagement of the shuttle to dock with a portable electronic device.

In this example, as shown in FIG. 9, extended ridges 903 and 905 on the media player shuttle 410 are respectively captured in mating recesses 910 and 912 in the body of a portable electronic device (representatively shown as camera 405, although the same shuttle retention mechanisms may also apply to the handheld game device 805). The bottom ridge 905 is slideably attached to the media player shuttle 410 and further is coupled to the release button 850. The bottom ridge 905 may further be biased (using a spring, or other elastically deformable member, for example), in an extended position.

A male device connector 915 located on the camera 405 is configured for mateable engagement with a corresponding female docking connector 918 that is accessed through a slot 920 on the back surface of the media player shuttle 410. The connectors 915 and 918 are proprietary, device-specific connectors in this particular example. However, in alternative arrangements, standardized connector types may also be used. When engaged, the connectors 915 and 918 enable signals (and power in some instances) to be transmitted between the media player shuttle 410 and camera 405.

Figure 10:
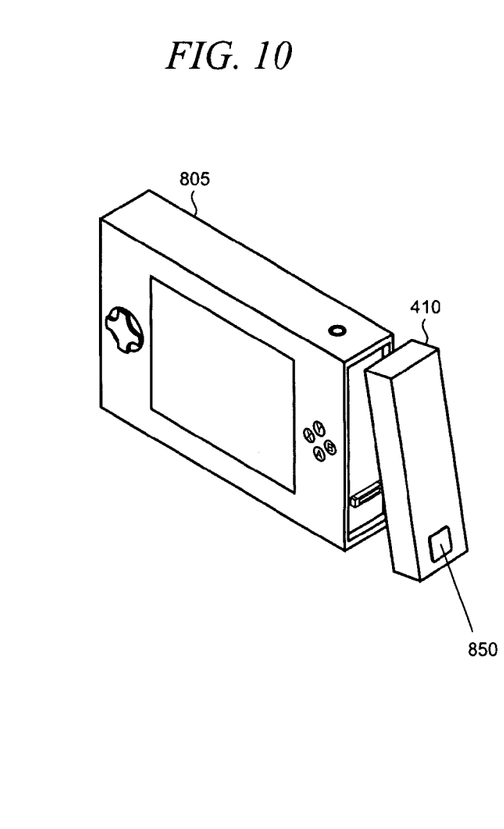
Figure 11:
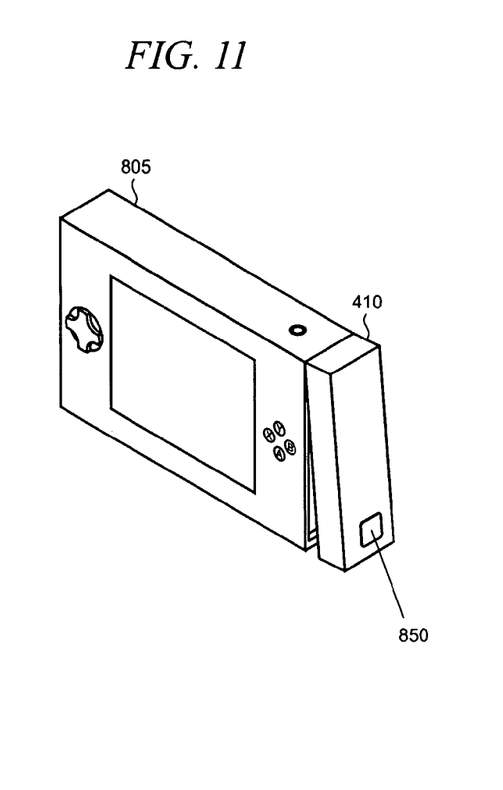
Figure 12:
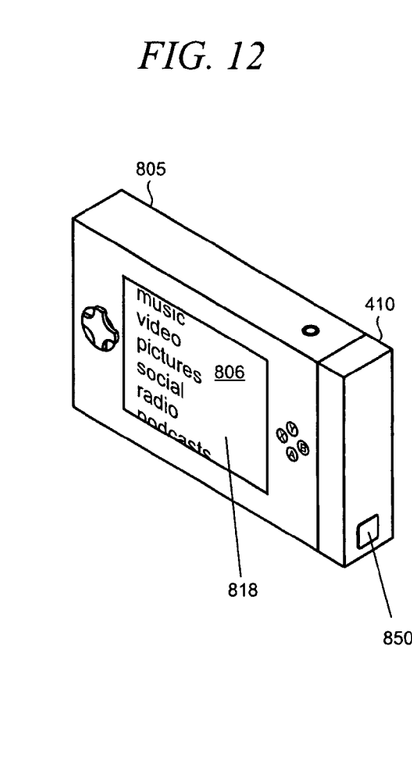

As shown in the sequence of drawings in FIGS. 10-12, the user 105 may engage the top ridge of the media player shuttle 410 into the corresponding recess in the portable electronic device (in this example, the handheld game device 805) and then guide the shuttle so that the bottom ridge snaps into place and the connectors become engaged. An audible click and tactile sensation may be used to indicate to the user 105 that the shuttle is engaged and is ready for use. The GUI 806 may also be automatically shown on the display screen 818 to further reinforce to the user 105 that the functionality provided by the media player shuttle 410 is available on the handheld game device, as shown in FIG. 12.

Figure 13:
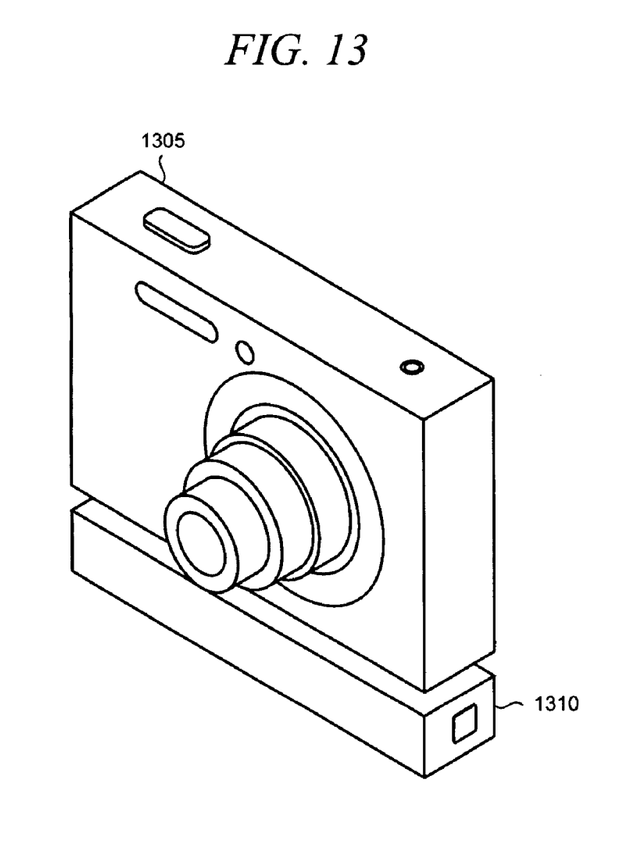
FIGS. 13-16 show various alternative configurations of the media player shuttle and portable electronic device.
Figure 14:
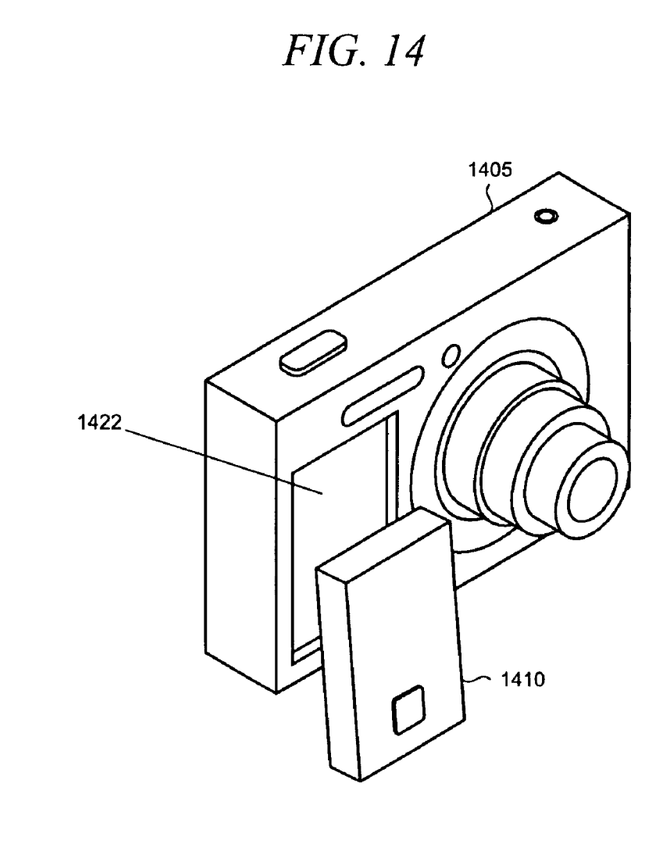
Figure 15:
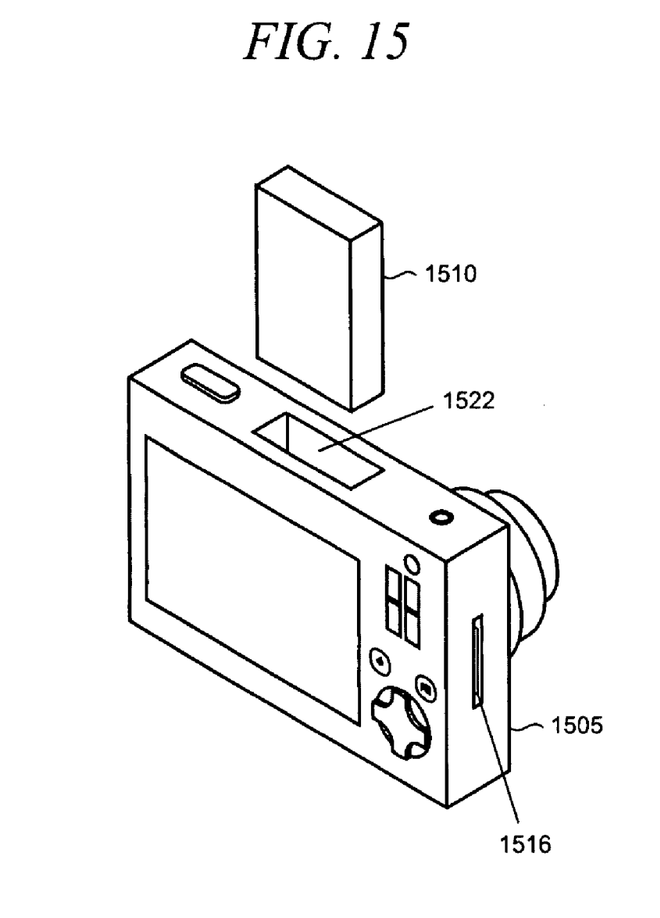
Figure 16:
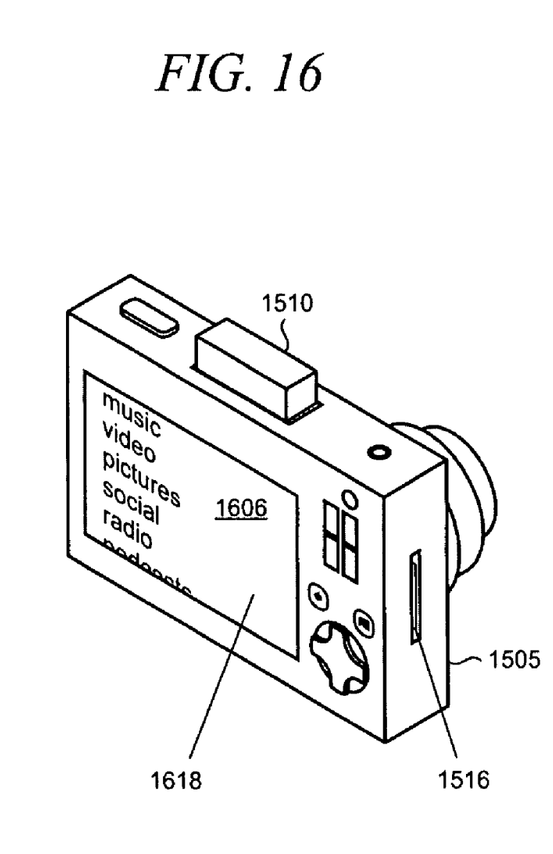

Although the media player shuttle 410 is shown as being engagable to the side of the portable electronic device in FIGS. 10-12, other configurations may also be used to meet the needs of a particular usage scenario. FIGS. 13-16 show several illustrative alternative configurations. In FIG. 13, a media player shuttle 1310 is arranged to snap to the bottom of a camera 1305 that is adapted to interact with the shuttle. In FIG. 14, a media player shuttle 1410 is adapted to snap into a recess 1422 in the front of a camera 1405. FIGS. 15 and 16 show a camera 1505 in which a media player shuttle 1510 is inserted into a slot 1522 on the top of the camera 1505. In many cases, it may be desirable for the media player GUI (as representatively indicated by reference numeral 1606 in FIG. 16) to be automatically shown on the display screen 1618 of the device once the media player shuttle is snapped into place and ready to be used. It will be appreciated that other arrangements and variations from those shown may also be implemented.

FIGS. 15 and 16 also show a female synchronization connector ("sync") 1516 that is accessed through a slot on the side of the camera 1505. Other portable electronic devices that are adapted to interface with the media player shuttle may also utilize such a synchronization connector which may located in various places (i.e., not just on the side of the device as shown in FIGS. 15 and 16).

Figure 17:
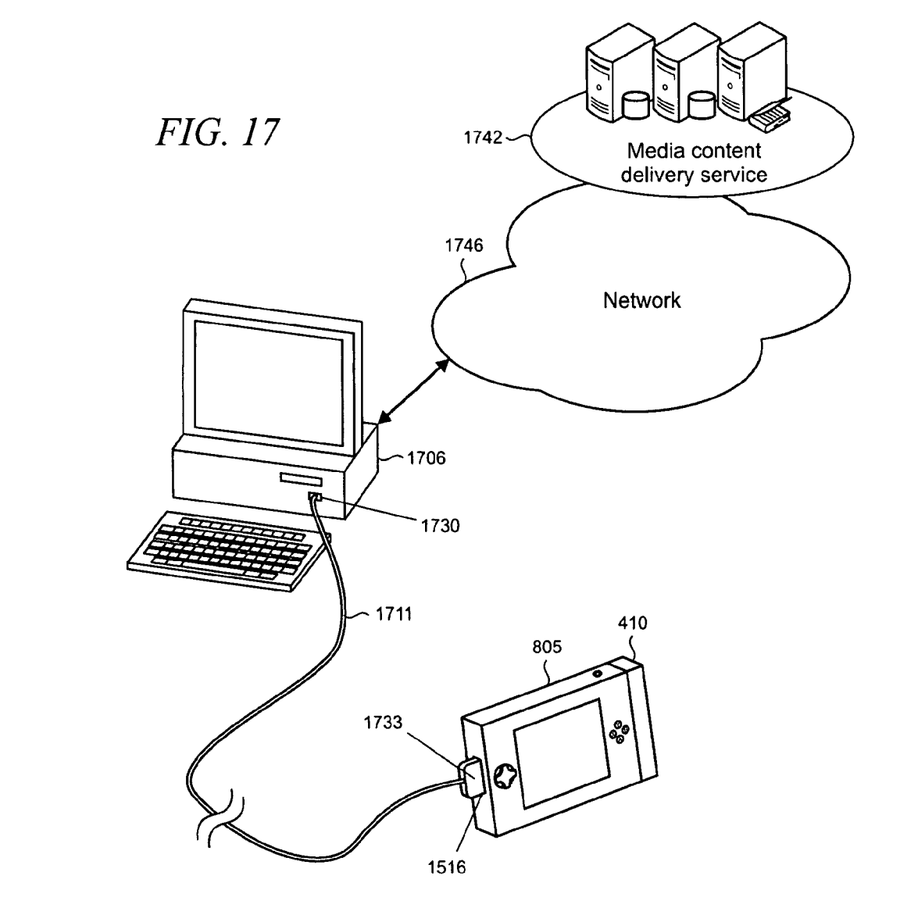
FIG. 17 shows an illustrative arrangement in which a portable game player and docked media player shuttle are connected to a PC with a sync cable.
Figure 18:
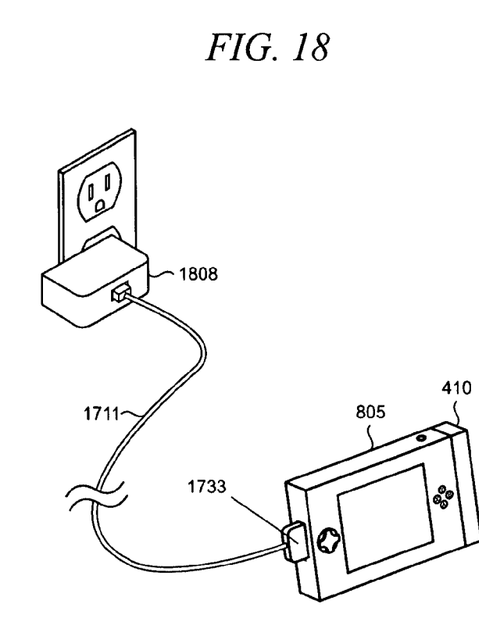
FIG. 18 shows an illustrative arrangement in which a portable game player and docked media player shuttle are connected to an AC power adapter with a sync cable.

As shown in FIG. 17, the sync connector 1516 enables the portable electronic device (as represented by the handheld game device 805) to connect to devices such as a PC 1706 using a sync cable 1711 to synchronize media content and data to the media player shuttle 410 when it is docked to the device. The sync connector 1516 may also be used to connect the sync cable 1711 to an AC power adapter 1808 to charge the camera's on-board battery as well as the battery on-board the shuttle (when used), as shown in FIG. 18. The media player shuttle 410 may be optionally equipped, in some cases, with wireless networking capability through an RF wireless module or similar structure to perform such synchronization wirelessly as well as to communicate with devices in a peer to peer configuration.

Returning to FIG. 17, the sync cable 1711 is coupled to the PC 1706 via a serial data port such as a USB (Universal Serial Bus) port 1730. In this example, the other end of the sync cable 1711 uses a male connector 1733 that is proprietary and device-specific and is similar in form and function as the connector 915 (FIG. 9) that is used to dock the media player shuttle to the device. Therefore, the sync cable 1711 may also be directly connected to the media player shuttle 410 by connecting the sync cable's male connector 1733 to the female docking connector 918 (FIG. 9).

The synchronization process implemented between the PC 1706 and handheld game device 805 typically enables media content such as music, video, images, games, information, and other data to be selected by a user and then downloaded from an on-line source or media content delivery service 1742 over a network 1746 such as the Internet to the PC 1706. The downloaded media content can then be transferred and stored in the docked media player shuttle. In this way, the PC 1706 operates as an intermediary or proxy device between the service 1742 and the combined handheld game device 805 and docked media player shuttle 410.

Because the media player shuttle 410 provides full player functionality when docked to a portable electronic device (such as the camera 405 or handheld game device 805) and the device functionality is not compromised in any way, the combination of shuttle and device provide a smart docking system. The smart docking functionality is further enhanced by the capability to synchronize the media player shuttle to a PC to update media content and/or keep other data on the shuttle up to date.

Figure 19:
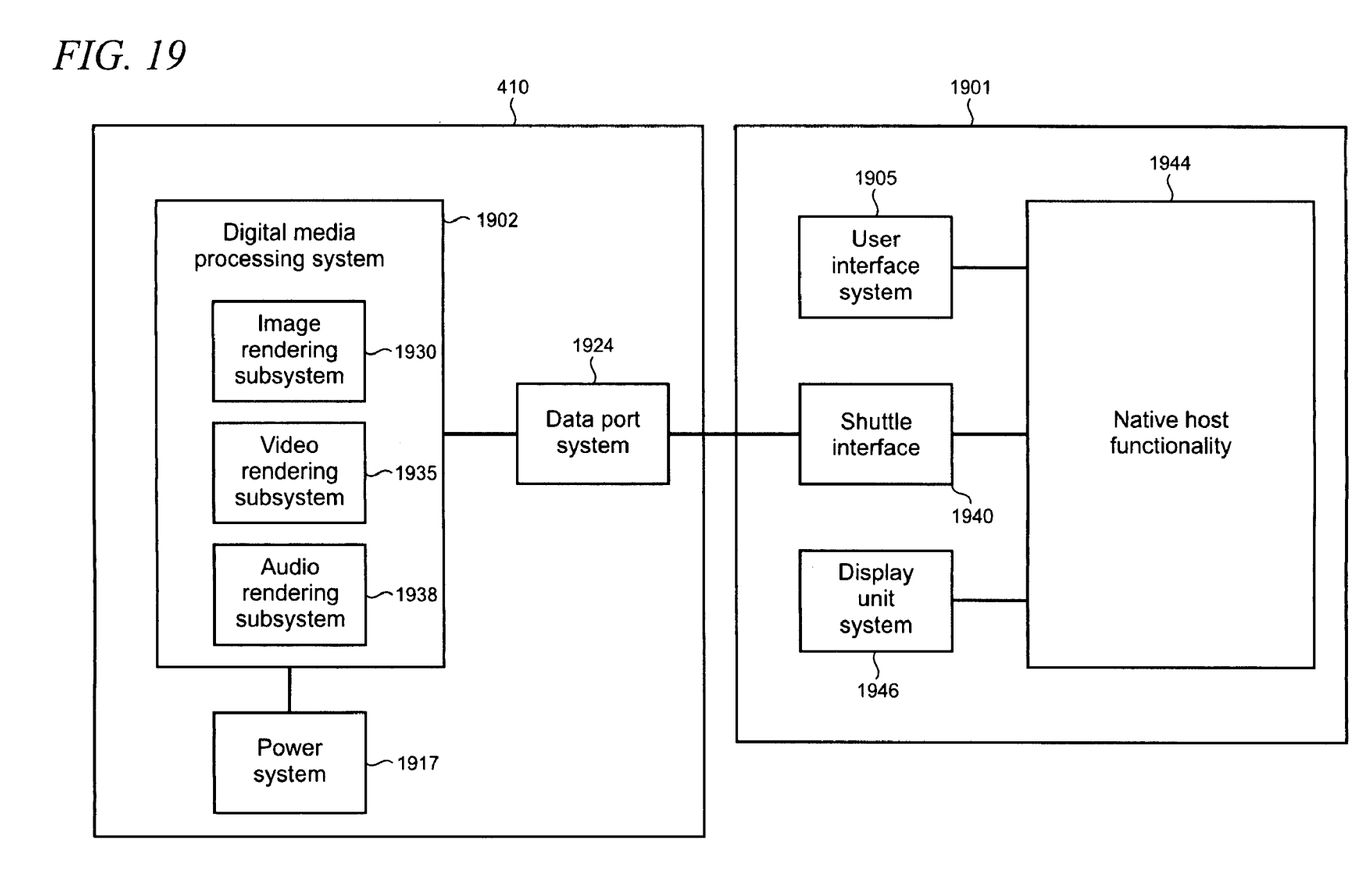
FIG. 19 is a simplified block diagram that shows various functional components of an illustrative example of a media player shuttle that is docked with a portable electronic device.

FIG. 19 is a simplified block diagram that shows various functional components of an illustrative example of a media player shuttle 410 that is docked to a host portable electronic device 1901. The functional components in the media player shuttle include a digital media processing system 1902, an optionally-utilized power source system 1917, and a data port system 1924. The digital media processing system 1902 further comprises an image rendering subsystem 1930, a video rendering subsystem 1935, and an audio rendering subsystem 1938.

The digital media processing system 1902 is the central processing system for the personal media shuttle 410 and provides functionality that is similar to that provided by the processing systems found in a variety of electronic devices such as PCs, mobile phones, PDAs, handheld game devices, digital recording and playback systems, and the like.

Some of the primary functions of the digital media processing system 1902 may include receiving media content files downloaded to the media player shuttle 410, coordinating storage of such media content files, recalling specific media content files on demand, and rendering the media content files into audio/visual output on a coupled display screen for the user 105. Additional features of the digital media processing system 1902 may also include searching external resources for media content files, coordinating DRM (digital rights management) protocols for protected media content when such protected content is utilized, and interfacing directly with other recording and playback systems.

As noted above the digital media processing system 1902 further comprises three subsystems: the video rendering subsystem 1935 which handles all functionality related to video-based media content files, which may include files in MPEG and other formats; the audio rendering subsystem 1938 which handles all functionality related to audio-based media content including, for example music in the commonly-utilized MP3 format and other formats; and the image rendering subsystem 1930 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with other parts of the media player shuttle 410 as may be necessary to meet the requirements of a particular implementation.

The media player shuttle 410 has an optionally-utilized power source system 1917 that provides power to the entire device. However, as noted above, the power may also be provided by the host portable electronic device 1901. In such cases, the device 1901 will typically utilize a power system that is similarly arranged.

When utilized, the power source system 1917 may be coupled directly to the digital media processing system 1902 and indirectly to the other systems and subsystems throughout the shuttle. The power source system 1917 may also be directly coupled to any other system or subsystem of the media player shuttle 410. Typically, the power source may comprise a battery, a power converter/transformer, or any other conventional type of electricity-providing power source, portable or otherwise.

The data port system 1924 is also functionally coupled to the digital media processing system 1902 and provides a mechanism by which the media player shuttle 410 can interface with the external host portable electronic device 1901. A shuttle interface 1940 couples the digital media processing system 1902 in the media player shuttle 410 via the data port system 1924 to the native host functionality 1944, such as camera or game device functionality, which is supported by the host device 1901. Such native functionality may be arranged conventionally, and accordingly, is not described in any further detail herein.

A display unit system 1946 supports a display screen (e.g., display screens 618 and 818). Audio output through the audio jack for playback of rendered media content may also be supported by display unit system 1946. The display unit system 1946 may also functionally support and complement the operation of a user interface system 1905 by providing visual and/or audio output to the user 105 during operation of the device 1901.

Figure 20:
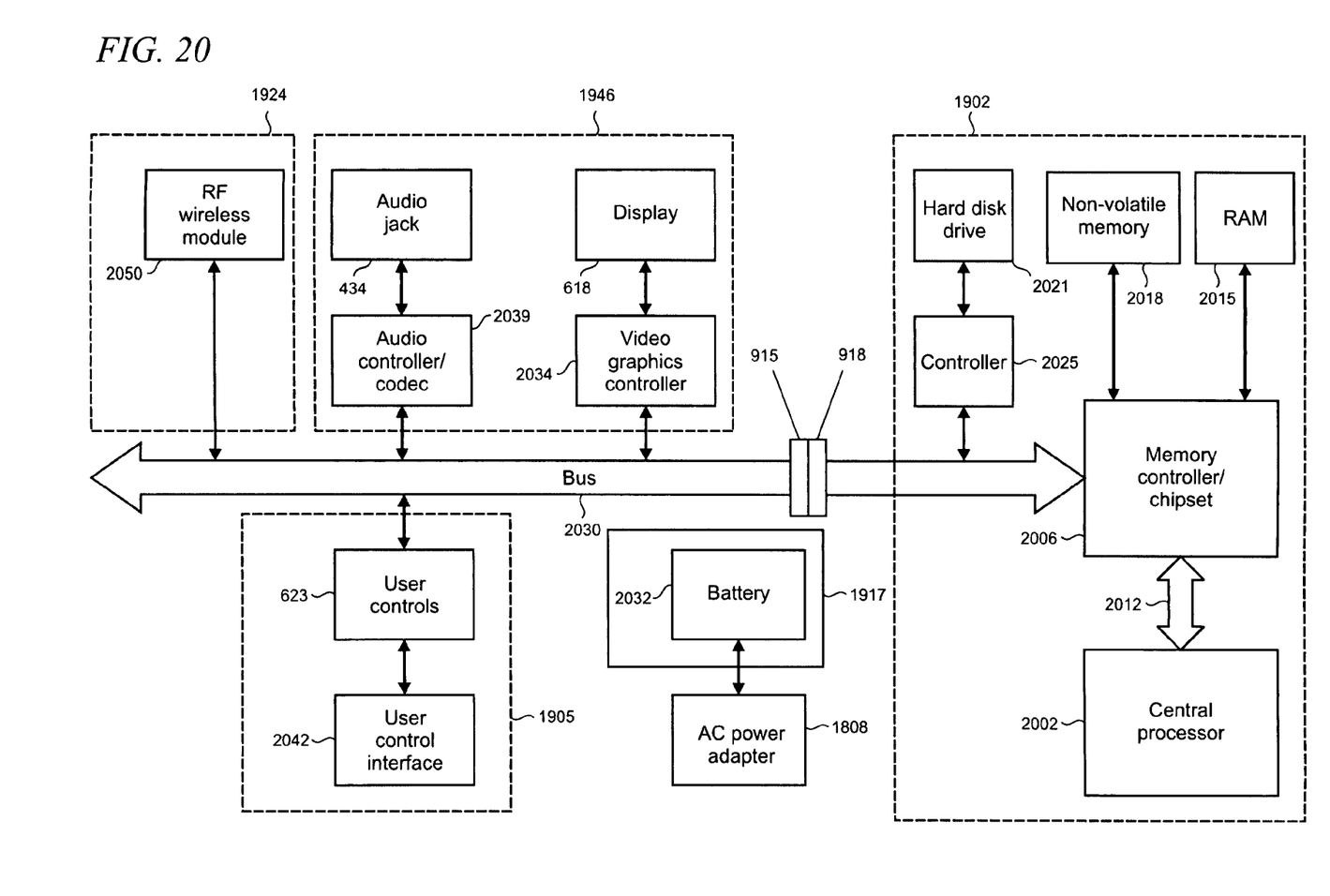
FIG. 20 is a simplified block diagram that shows various physical components of an illustrative example of a media player shuttle.

FIG. 20 is a simplified block diagram that shows various illustrative physical components of the media player shuttle 410 and the host portable electronic device 1901 when they are docked. FIG. 20 is based on the functional components shown in FIG. 19 and described in the accompanying text (which are represented in FIG. 20 by dashed lines). These components include the digital media processing system 1902, the user interface system 1905, the display unit system 1946, the data port system 1924, and the power system 1917. While each physical component is shown as included in only a single functional component in FIG. 20 the physical components may, in fact, be shared by more than one functional component.

The physical components include a central processor 2002 coupled to a memory controller/chipset 2006 through, for example, a multi-pin connection 2012. The memory controller/chipset 2006 may be, in turn, coupled to random access memory ("RAM") 2015 and/or non-volatile memory 2018 such as solid-state Flash memory. These physical components, through connectivity with the memory controller/chipset 2006, may be collectively coupled to a hard disk drive 2021 (or alternatively, additional Flash memory) via a controller 2025, as well as to the rest of the functional component systems via a system bus 2030. The system bus 2030 is physically extended between the media player shuttle and the portable electronic device when the shuttle and device are docked and the respective device and docking connectors 915 and 918 (also shown in FIG. 9) are mateably engaged.

In the power supply system 1917, a rechargeable battery 2032 may be used to provide power to the components using one or more connections (not shown). The battery 2032, in turn, may also be coupled to an external AC power adapter 1808 or receive power when coupled to a powered USB port, for example, when synchronizing with the PC 1706 as shown in FIG. 17.

The display screen 618 (or display screen 818) is associated with a video graphics controller 2034. The video graphics controller will typically use a mix of software, firmware, and/or hardware, as is known in the art, to implement a GUI (e.g., GUI 606 or 806) on the display screen and to render video content that is stored on the media player shuttle 410. Along with the audio jack 434 (or jack 834) and its associated audio controller/codec 2039, these components comprise the display unit system 1946 and may be directly or indirectly connected to the other physical components via the system bus 2030.

The user controls 623 (or controls 823 are associated with a user control interface 2042 in the user interface system 1905 that implements the user control functionality that is used to support the interaction with the GUI. These components may also directly or indirectly connect to the other components via the system bus 2030.

FIG. 20 also shows that the data port system 1924 further comprises an optionally-utilizable RF wireless module 2050. As noted above, such capability may be used to perform the synchronization process wirelessly as well as to network with other devices in a peer to peer networking configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A media player shuttle arranged to interface with a portable electronic device, comprising:
    a body arranged for removable engagement with the portable electronic device;
    a docking connector disposed in the body and configured for mateable engagement with a corresponding device connector disposed in the portable electronic device, the device and docking connectors being coupled through the removable engagement between the body and the portable electronic device, and when so coupled providing a signal path there through for coupling media player functionality provided by the media player shuttle to the portable electronic device; and
    a digital media processing system located within the body for providing the media player functionality but excluding a display screen and user controls, the display screen and user controls instead being provided by the portable electronic device when the media player shuttle is engaged with the portable electronic device,
    wherein said digital media processing system includes an image rendering subsystem, a video rendering subsystem and an audio rendering subsystem, and
    wherein each of the image rendering subsystem, the video rendering subsystem and the audio rendering subsystem is contained within the body of the media player shuttle.

2. The media player shuttle of claim 1 in which the portable electronic device is arranged to include native functionality comprising one of camera, PDA, mobile phone, handheld game device, smartphone, or ultra-mobile computer.

3. The media player shuttle of claim 1 further including a retention mechanism for positively retaining the body to the portable electronic device.

4. The media player shuttle of claim 3 in which the retention mechanism provides a snap fit and is further arranged to include audible or tactile feedback to a user to indicate that the body has fully engaged with the portable electronic device.

5. The media player shuttle of claim 1 further including a media content store for storing media content, the store comprising one of hard disk or non-volatile memory.

6. The media player shuttle of claim 1 further including a power system supporting at least one of battery or charging functionality.

7. The media player shuttle of claim 1 in which the digital media processing system is configured for rendering at least one of image, video, or audio content on the portable electronic device.

8. The media player shuttle of claim 1 further including an RF wireless module for performing wireless communication during one of synchronization or peer to peer networking.

9. A portable electronic device that is adapted to interface with a media player shuttle, comprising:
    a body being configured to receive the media player shuttle in a removable and engagable manner;

a device connector configured for mateable engagement with a corresponding docking connector disposed in the media player shuttle, the device and docking connectors, when coupled by the receipt of the media player shuttle to the body, providing a signal path therethrough for coupling media player functionality provided by the media player shuttle to the portable electronic device, wherein the media player functionality is provided by a digital media processing system within the media player shuttle, the system including an image rendering subsystem, a video rendering subsystem and an audio rendering subsystem, and wherein each of the image rendering subsystem, the video rendering subsystem and the audio rendering subsystem is contained within the body of the media player shuttle; and circuitry disposed in the body for integrating the media player functionality from the media player shuttle with native functionality when the media player shuttle is received by the body and the connectors are coupled.

10. The portable electronic device of claim 9 in which the device is a digital camera.

11. The portable electronic device of claim 9 in which the device is a handheld game device.

12. The portable electronic device of claim 9 in which the body is configured to receive the media player shuttle substantially on a side of the body.

13. The portable electronic device of claim 9 in which the body is configured to receive the media player shuttle substantially on a bottom of the body.

14. The portable electronic device of claim 9 in which the body is configured with a slot to receive the media player shuttle.

15. The portable electronic device of claim 9 in which the body is configured with a recess to at least partially enclose the media player shuttle within the body.

16. The portable electronic device of claim 9 further including a wired communications interface for interfacing with a communications cable, the communications interface supporting signal communications between the portable electronic device and a remote electronic device.

17. The portable electronic device of claim 9 further including an audio jack for interfacing with earphones through which audio may be rendered by the media player shuttle.

18. The portable electronic device of claim 9 further including user controls for operating the media player functionality.

19. The portable electronic device of claim 9 further including a display screen for displaying video content rendered by the media player shuttle.

20. A method for distributing digital media content over a network, the method comprising the steps of:

receiving a signal representing a user selection of media content from a PC, the PC being operatively coupled to a portable electronic device having a docked media player shuttle to perform a synchronization process, the media player shuttle providing media player functionality to the portable electronic device when docked and being removable and engagable so that media player rendering capabilities are separable from native functionality provided by the portable electronic device, wherein the media player functionality is provided by a digital media processing system within the media player shuttle, the system including an image rendering subsystem, a video rendering subsystem and an audio rendering subsystem, and wherein each of the image rendering subsystem, the video rendering subsystem and the audio rendering subsystem is contained within the body of the media player shuttle; and sending the media content to the PC responsively to the received signal so that the media content may be downloaded by the PC and transferred to the media player shuttle during the synchronization process for subsequent rendering on the portable electronic device.

* * * * *